G. W. R. Combs.
Buckle.
No. 70,320. Patented Oct. 29, 1867.
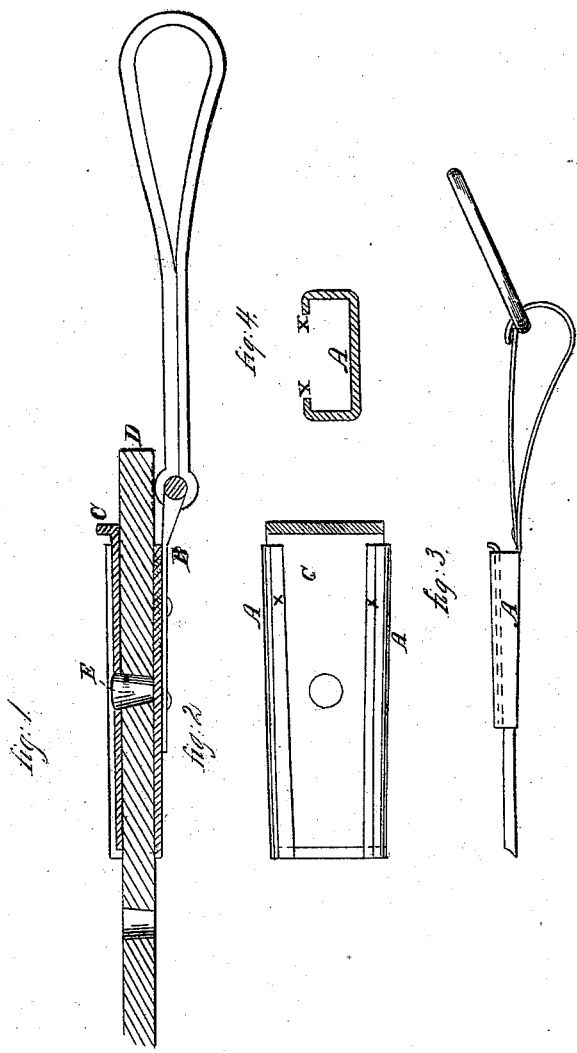

United States Patent Office.

GEORGE W. R. COMBS, OF ALLIANCE, OHIO.

Letters Patent No. 70,320, dated October 29, 1867.

IMPROVED STRAP-HOLDING DEVICE.

The Schedule referred to in these Letters Patent and making part of the same.

TO ALL WHOM IT MAY CONCERN:

Be it known that I, GEORGE W. R. COMBS, of Alliance, in the county of Stark, and in the State of Ohio, have invented certain new and useful improvements in Device for Receiving, Retaining, or Holding Straps in their Place; and do hereby declare that the following is a full, clear, and exact description thereof, reference being had to the accompanying drawings, and to the letters of reference marked thereon.

In the annexed drawings, making part of this specification, A represents a metallic box, which may be cast with loops to its bottom at each end, or only one end, as the case may require. A loop is seen upon the bar B, which is riveted to the bottom of the box, instead of being cast, as I intend it shall be. The form of the mouth of this box is clearly seen in Figure 4. As the box recedes from this mouth it slightly contracts, both in width and depth, so that a slide entering its mouth could not pass through its rear end. C represents a slide, which is made tapering upon its edges, or in its width to correspond with the taper of the box. On the under side of this slide is cast a pin, E. This pin is cast long enough to reach to the bottom of the box, when the slide is inserted in said box.

To use this buckle or device, the leather strap to be confined is placed on the under side of the slide C, with the pin E entering one of the holes in the strap. The slide and strap are then inserted in the mouth, and drawn back until the said slide is bound firmly between the contracting sides of the box. The slide C is provided at its large end with a little flange, which serves the double purpose of assisting in drawing it out, and also preventing it running in the box too far.

This device may be used, by a little different construction, for any of the purposes for which buckles are used in harness. A snap-hook may be formed upon the box, so that the device may be used upon hitching-straps.

Having thus fully described my invention, what I claim as new, and desire to secure by Letters Patent, is—

The metallic box A, contracted longitudinally and vertically at its end, having its sides $x\ x$ turned so as to form a groove to allow the plate C to be secured and connected to the leather at its bottom by the bar B, in the manner as herein described and for the purposes set forth.

In testimony that I claim the foregoing I have hereunto set my hand this 9th day of May, 1867.

G. W. R. COMBS.

Witnesses:
P. ALLEN,
R. P. JOHNSON.